US009985786B1

(12) United States Patent
Bhabbur et al.

(10) Patent No.: US 9,985,786 B1
(45) Date of Patent: May 29, 2018

(54) CROSS-DEVICE AUTHENTICATION

(71) Applicant: CA, Inc., Islandia, NY (US)

(72) Inventors: Gyaneshwar Bhabbur, Secunderabad (IN); Nirupama Behera, Sambalpur (IN)

(73) Assignee: CA, Inc., Islandia, NY (US)

( * ) Notice: Subject to any disclaimer, the term of this patent is extended or adjusted under 35 U.S.C. 154(b) by 0 days. days.

(21) Appl. No.: 15/819,998

(22) Filed: Nov. 21, 2017

(51) Int. Cl.
| H04L 9/32 | (2006.01) |
| H04L 29/06 | (2006.01) |
| G06K 19/06 | (2006.01) |
| H04L 9/08 | (2006.01) |
| H04L 9/30 | (2006.01) |
| G06F 3/0489 | (2013.01) |
| G06F 3/0488 | (2013.01) |

(52) U.S. Cl.
CPC ...... *H04L 9/3226* (2013.01); *G06K 19/06037* (2013.01); *H04L 9/0825* (2013.01); *H04L 9/30* (2013.01); *H04L 63/0838* (2013.01); *H04L 63/10* (2013.01); *G06F 3/0488* (2013.01); *G06F 3/0489* (2013.01); *H04L 2463/082* (2013.01)

(58) Field of Classification Search
CPC ....... H04L 9/30; H04L 9/3226; H04L 9/0825; H04L 63/10; H04L 63/0838; H04L 2463/082; G06K 19/06037; G06F 3/0488; G06F 3/0489
See application file for complete search history.

(56) References Cited

U.S. PATENT DOCUMENTS

| 8,442,295 | B2 * | 5/2013 | Sam | G06K 9/033 |
| | | | | 382/135 |
| 9,092,600 | B2 * | 7/2015 | Scavezze | G06F 21/31 |
| 9,104,677 | B2 * | 8/2015 | Koo | G06Q 10/06 |
| 9,767,585 | B1 * | 9/2017 | Carter, Jr. | G06T 11/60 |
| 9,792,594 | B1 * | 10/2017 | Bayha | G06Q 20/1085 |

(Continued)

OTHER PUBLICATIONS iOS 11: Why developers are embracing Apple's ARKit, COMPUTERWORLD https://www.computerworld.com/article/3230503/apple-ios/ios-11-why-developers-are-embracing-apples-arkit.html, Oct. 5, 2017, pp. 1 to 4.

(Continued)

*Primary Examiner* — Beemnet Dada
(74) *Attorney, Agent, or Firm* — Pillsbury Winthrop Shaw Pittman LLP

(57) ABSTRACT

Provided is a process, including: receiving a request to authenticate a user to access resources from a first computing device; in response to receiving the request, sending, with one or more processors, instructions that cause the first computing device to display a machine readable image, wherein: the machine readable image is configured to, upon being sensed with a camera of a second computing device, cause the second computing device to present, with a display of the second computing device, a user interface with a user-credential input configured based on the machine readable image displayed by the first computing device; receiving from the second computing device, a value demonstrating possession of a user credential and an identifier of the second computing device, the user credential being entered into the second computing device via the user interface configured based on the machine readable image displayed by the first computing device.

20 Claims, 4 Drawing Sheets

(56) References Cited

U.S. PATENT DOCUMENTS

| | | | |
|---|---|---|---|
| 2016/0253563 A1* | 9/2016 | Lam | H04L 63/08 |
| | | | 348/130 |
| 2016/0259929 A1 | 9/2016 | Cash | |
| 2016/0364723 A1 | 12/2016 | Reese et al. | |
| 2017/0300709 A1 | 10/2017 | Tzeng et al. | |
| 2017/0316704 A1 | 11/2017 | Lundin et al. | |
| 2017/0317996 A1 | 11/2017 | Poomachandran et al. | |
| 2017/0331924 A1 | 11/2017 | Katori | |

OTHER PUBLICATIONS

'ARCore api implementation,' ARCore, https://developers.google.com/ar/reference/java/com/google/ar/core/package-summary, Aug. 28, 2017, pp. 1 to 2.

\* cited by examiner

CROSS-DEVICE AUTHENTICATION

CROSS-REFERENCE TO RELATED APPLICATIONS

No cross reference is presented at this time.

BACKGROUND

1. Field

The present disclosure relates generally to cybersecurity and, more specifically, to cross-device authentication for distributed systems.

2. Description of the Related Art

Cross device multifactor authentication is used in a variety of scenarios. Often, when a user registers a new account with a remotely hosted distributed application, like a web application or service accessed with a native application on a remote server, the user may select both a password and identify a mobile computing device. Later, when attempting to obtain authentication to access these remote services, the user may be asked to supply the password and to demonstrate possession of the mobile computing device, for instance. Possession can be demonstrated by, for instance, supplying a four or six digit code sent by text message to a mobile computing device registered to a phone number that the user supplied during the onboarding process.

SUMMARY

The following is a non-exhaustive listing of some aspects of the present techniques. These and other aspects are described in the following disclosure.

Some aspects include a process that includes: receiving, with one or more processors, from a first computing device, via a network, a request to authenticate a user to access resources over a network with the first computing device; receiving, with one or more processors, from the first computing device, via a network, a user identifier associated with the request to access resources; in response to receiving the request, sending, with one or more processors, instructions that cause the first computing device to display a machine readable image, wherein: the machine readable image is configured to, upon being sensed with a camera of a second computing device, cause the second computing device to present, with a display of the second computing device, a user interface with a user-credential input configured based on the machine readable image displayed by the first computing device; receiving, with one or more processors, from the second computing device, a value demonstrating possession of a user credential and an identifier of the second computing device, the user credential being entered into the second computing device via the user interface configured based on the machine readable image displayed by the first computing device; determining, with one or more processors, to authorize the user to access resources over the network with the first computing device, at least in part, by: determining, based on the identifier of the second computing device, that the second computing device is registered in a user profile to a user corresponding to the user identifier received from the first computing device; and determining that the value demonstrating possession of the user credential received from the second computing device is valid; and in response to the determination, causing, with one or more processors, the user to be granted access to the resources over the network with the first computing device.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
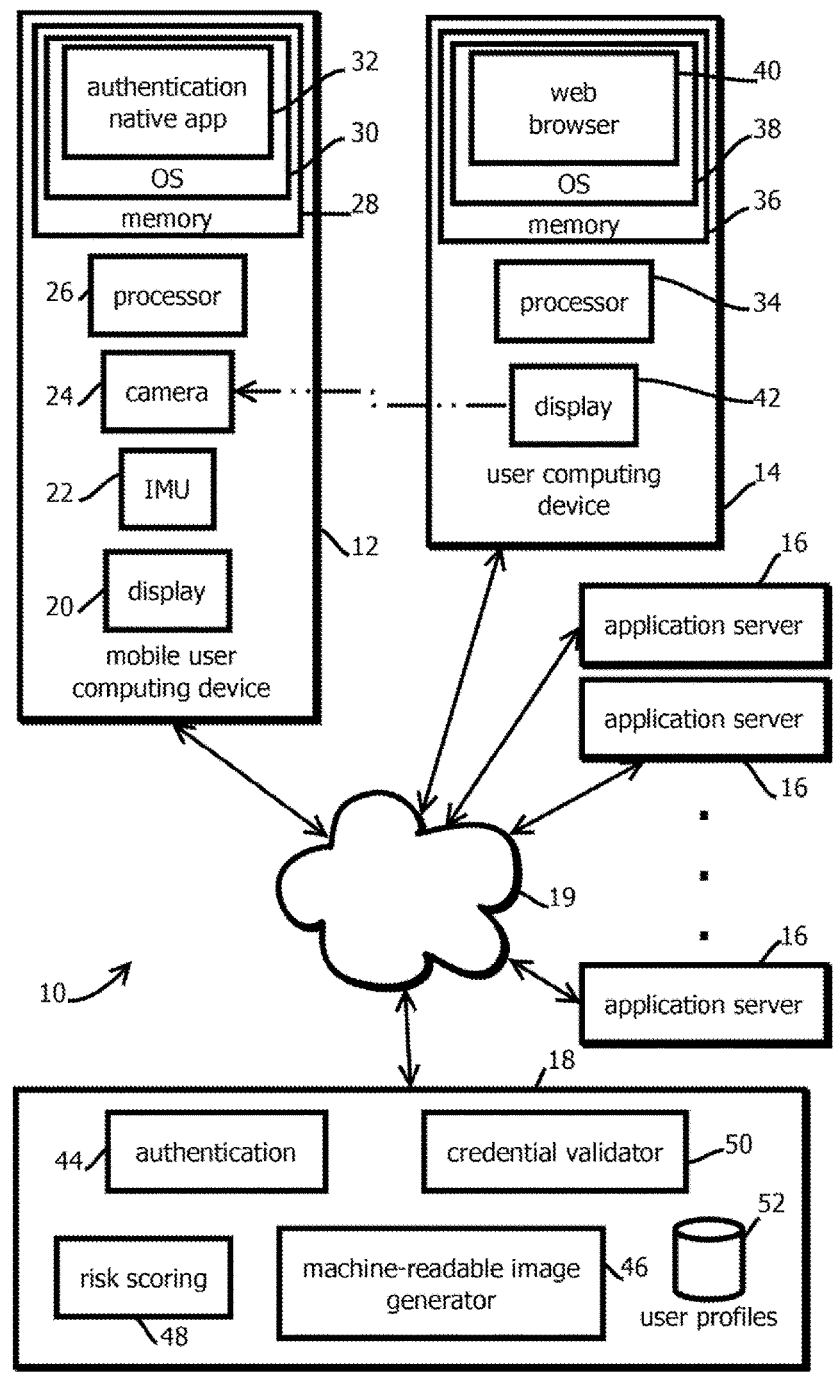
FIG. 1 is a physical and logical architecture block diagram showing an example of a cross device multifactor authentication system in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of cybersecurity and human-computer interaction. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Many existing cross-device authentication techniques are difficult to use and insecure. Often, a user supplies credentials to a website, and then the web server causes a code to be sent to the user's mobile device, which is then entered back into the website by the user to authenticate the user with two factors: knowledge of the supplied credential, and possession of the mobile device. Many users find this interaction unpleasant. Some studies have shown nearly half of computer users do not use two factor authentication on at least some web services. Further, this approach can be attacked in some cases by "shoulder surfing," where someone looking over the user's shoulder sees the entered credential and the code sent to their mobile device. Finally, the approach can be susceptible to man-in-the-middle attacks (sending a counterfeit webform requesting the user's credentials) combined with attacks in which a user's cell phone number is transferred by an adversary to a device they control (e.g., by a social engineering attack on a cell phone service provider).

To mitigate some of these issues, and in some embodiments all of these issues, some embodiments engage sensors on a mobile computing device to extract data about the user interface sent to the computer in which a user enters at least one credential, e.g., the computer showing a web browser in which a user is seeking authentication. In some cases, the extracted data is used to validate that the user interface is legitimate and, upon validation, some embodiments provide an augmented reality based authentication input on the mobile device. In some cases, authentication is implemented using public key infrastructure (PKI) or one time passwords (OTP) generated using user-registered mobile devices or transaction signing, e.g., while scanning with a mobile device data appearing on a screen of a second device being authenticated. With this technique, some embodiments tightly and securely bind a web application and a mobile application. Some embodiments further provider users insight regarding information to be exchanged between a web application and a mobile application, thereby potentially providing information that serves to limit the user's activities before reading data from a displayed web application page.

In some cases, a virtual keypad based input option is made available, and in some cases, the keypad (or other user input) is dynamic adjusted (e.g., with unpredictable key positions). For instance, in some cases, the mobile user interface may include augmented input options such as an augmented reality swipe pad or an augmented reality scrambled keypad, e.g., with user interface inputs rearranged after each per keystroke, and in some cases, these interfaces may be configured (and selectively presented) based on configuration data or authentication data presented by a web application on another computing device display screen. Some embodiments may securely exchange camouflaged information between the web application and the mobile application using augmented input options via the scanned information based on the configuration data. In some cases, data to be exchanged may be PKI or mobile OTP generated information or challenge/keys/risk data collection from the user machine. The data may be used by mobile application after de-camouflaging the displayed and scanned information based on the augmented input options and data exchange configuration. Some embodiments may read or otherwise scan multiple values (e.g., data sources/objects/images/codes) displayed by the web application, including metadata about the data to be exchanged or risk data (e.g., software or hardware device fingerprints) in the same session. PKI/Mobile OTP generated information may be used by the mobile application to generate an OTP or cryptographically sign a challenge. In some embodiments, transactions from the mobile application to a backend server may be cryptographically signed after an initial handshake between the web application and mobile application.

Some embodiments may provide a variety of related features, such as:

a. Augmented popup with alarm or warning messages, e.g., indicating issues with authenticity while exchanging the data from the web application.

b. Enhanced security in mobile applications based on the data from the web application authenticated page.

c. Enhanced augmented reality details, such as authenticity or risk information about the data to be processed by the mobile application, thereby potentially providing enhanced decision-making capability to the user.

d. Enhanced security communication between the mobile application and web application authenticated page providing the data input, which may be camouflaged based on the configuration and de-camouflaged with the augmented input options, such as the above noted augmented swipe pad or augmented scrambled keypad that is rescrambled after each keystroke.

e. An augmented scrambled keypad that provides enhanced security by presenting dynamic positioning of the keypad, which may be positioned and sized on the mobile device display relative to one or more scanned objects on another display, e.g., with configuration and letters on the keypad being adjusted with some (e.g., all) keystrokes, thereby potentially providing enhanced unpredictability to un-authorized users.

f. Configurable mapping of the keypad visual letters with encoded letters providing masking, e.g., with the augmented reality or non-augmented reality display serving as a "decoder ring" for the other display.

g. Processing multiple inter-dependent scan points or other objects on the web application authenticated page concurrently.

h. Transactions from the mobile application to the backend server may be signed based on the data from the authentication web application page, which in-turn may be verified by the backend server, thereby potentially increasing the security and authenticity of the transaction.

i. Camouflaged card information may be exchanged between the web application and the mobile application to generate transaction signing OTP or a PKI-based signed challenge or challenge response.

In some embodiments, some, and in some cases all of the above-described features may be implemented in a computing environment 10 shown in FIG. 1. It should be emphasized, though, that not all embodiments include all of the above-described features, afford all of the above-described benefits, or partially or fully mitigate all of the above-describe problems with traditional techniques, which is not to suggest that any other description herein is limiting. Rather, multiple, independently useful techniques are described, with various engineering and cost trade-offs, and some embodiments may implement some of those techniques while not implementing others.

As shown in FIG. 1, some embodiments may include a pair of computing devices of a user, in this case a mobile computing device 12 and a user computing device 14, along with one or more application servers 16 that may host remote resources the user seeks to access with the user computing device 14. Some embodiments may further include an authentication system 18 that determines whether to authenticate users seeking access on behalf of the application servers 16 by interfacing with the user computing devices 12 and 14, in accordance with the techniques described below. A single pair of user computing devices 12 and 14 for an individual user are shown, but embodiments are consistent with substantially more pairs of computing devices, and may include in commercial implementations more than 10, more than 100, or more than 1000 pairs of computing devices concurrently seeking authentication, and in some cases among a user to base exceeding 1 million, 10 million, or 100 million users. Similarly, three application servers 16 are shown by way of example, but some embodiments may include a single application server 16, which may be integrated with the authentication system 18. Some embodiments may include substantially more application servers 16, for instance more than 10, or more than 50 different application servers for more than 10 or more than 50 different web applications or application program interfaces at distinct web domains and data centers. In some embodiments, the illustrated components may communicate with one another via one or more networks 19, such as the Internet, various local area networks, cellular networks, wireless area networks, and the like.

In some embodiments, the mobile user computing device 12 may be a smart phone, a wearable computing device, a tablet computer, a laptop computer, a smartwatch, a head mounted display, or the like. In some cases, a non-mobile computing device may serve the role of the mobile user computing device 12. In some embodiments, the mobile user computing device 12 may include an onboard power supply, such as a battery and one or more radios by which wireless network access is provided to the network 19.

In some embodiments, the mobile user computing device 12 includes a display 20, and inertial measurement unit 22, a camera 24, a processor 26, and memory 28 storing program code of an operating system 30 and an authentication native application 32, in some cases among various other native applications. In some embodiments, the processor 26 may coordinate the operation of the other components illustrated and execute program instructions stored in memory 28, including executing the operating system 30 in the native application 32, in some cases interfacing via the native application 32 and the various illustrative hardware may be through various application program interfaces provided by the operating system 30. In some embodiments, the processor 26 is a central processing unit. In some embodiments, the processor 26 may execute program code of the native application 32 that causes the native application to provide the functionality described below, which is attributed to a mobile computing device, and some cases causing the camera 24 to sense (for instance capturing image of or a video feed of) a field of view of the camera 24, which a user may position to include the display of the user computing device 14 described below. In some embodiments, the processor 26 may further execute program code of the authentication native application 32 that registers the authentication native application 32 with an augmented reality framework, or calls an augmented reality library of the operating system 30. In some embodiments, these frameworks or libraries may be operative to pull or receive events from the inertial measurement unit 22 indicative of changes in position or orientation of the mobile user computing device, for instance, along six axes including three axes of translation that are orthogonal to one another and three axes of rotation that are orthogonal to one another. Further, such frameworks may be operative to execute various image processing techniques based on images from the camera 24 described below, which may include identifying and tracking features in such images that serve as anchors and fusing data from the anchors with that of the commercial measurement unit to reduce drift in augmented reality user interfaces. In some embodiments, the camera 24 is a rear facing camera or a front facing camera of the mobile computing device. In some embodiments, the camera 24 includes both an optical camera and a depth sensing camera, such as a time-of-flight camera, or a camera configured with an accompanying projector that projects a pattern of infrared symbols onto a region within a field of view of the optical camera. In some embodiments, the camera 24 is operative to detect these projected patterns or receive time-of-flight measurements and calculate a three-dimensional image including both pixel intensities and depth values indicative of distance between the camera and regions in a field of view corresponding to the pixels.

In some embodiments, the inertial measurement unit 22 includes three gyroscopes and three accelerometers. In some embodiments, the gyroscopes are configured to output a signal indicative of changes in rotation of the mobile user computing device 12, for instance, outputting a signal indicative of a change in a rate of rotation of the mobile user computing device about a given axis, e.g., a signal indicative of an amount of rotational acceleration. Further, the accelerometers may be configured to output a signal indicative of a change in velocity of the mobile user computing device 12 along a corresponding axis of translation, such as a measure of acceleration along that axis. In some embodiments, the inertial measurement unit 22 may be configured to integrate these values over time and provide an output indicative of an amount of rotational change in position and indicative of a change in spatial position, such as a six axes vector indicative of such changes between a starting time and an ending time. In some embodiments, the authentication native application 32 may query the inertial measurement unit 22 with the starting time and ending time and determine positions, sizes, and translations of displayed user interface elements in augmented reality display based upon the return vector. In some cases, adjustments may be made based upon features detected in images captured by the camera 24, such as anchor points detected in an imaged field of view. In some embodiments, the inertial measurement unit 22 may provide a relatively low latency indication of changes in camera position or orientation, while detected features within the field of view of the camera 24 may provide a slightly slower response, though more accurate measurement of position and orientation (collectively referred to as "pose).

In some embodiments, an augmented reality framework of the operating system or augmented reality library of the operating system 30 may be configured to automatically detect features within images, such as frames captured by the camera 24. In some cases, such features may be edges or ends of edges detected with an edge detection algorithm into which captured frames are input. Some embodiments may construct a point cloud of such features and label the corresponding points with estimated three-dimensional positions, such as with the vectors relative to an origin point in space for a given augmented reality session, which in some cases, may be initialized to a position of the mobile user computing device 12 upon initiation of a session. Based upon these factors, reading from the inertial measurement unit 22, and a position of features, such as anchor points within the field of view of the camera 24 at a later time, some embodiments may infer a pose of the mobile user computing device 12.

Some embodiments may then determine an augmented reality user interface appearance based upon the pose of the mobile user computing device 12, and in some cases, relative to the user computing device 14. In some embodiments, the mobile user computing device 12 may be moved by the user, while the user computing device 14 may remain static in which case the relative position of the mobile user computing device 12 to the user computing device 14 is the same as the change in position of the mobile user computing device 12 relative to an absolute frame of reference. In some embodiments, the pose of the mobile user computing device 12 may be a vector, such as a six axis vector indicating both translation along three axes and rotation or along three axes that are each orthogonal to one another relative to an initial pose of the mobile user computing device in augmented reality session.

Some embodiments of the authentication native application 32 may cooperate with an augmented reality framework or a library of the operating system 32 and construct a three-dimensional model of a user interface for an augmented reality display. In some embodiments, the three-dimensional model may include a plurality of three-dimensional polygons with vertices defined by vectors specified relative to the origin position for an augmented reality session. In some embodiments, the vertices may define polygons that have textures applied to surfaces of the polygon in the model, such as mapped images or colors. Based upon these models and the pose vector of the mobile user computing device 12, some embodiments may determine a view on the model for a given frame of an augmented reality session. Some embodiments may determine which portions of the model appear within the field of view of the camera where the model is positioned, as indicated by the vectors in the real space in which the user is present. Some embodiments may further determine how the model would appear within that space, for instance with perspective or affine transformations based upon the pose vector of the mobile user computing device 12 and the location of model elements. Some embodiments may further determine a lighting condition, for instance based on an average pixel intensity within captured frames from the video and modify textures of the model based upon the average pixel intensity, for instance, determining that a darker shade of a given color is to be applied responsive to a lower pixel intensity and that a lighter shade of that color is to be applied responsive to a brighter pixel intensity on average.

Some embodiments may further be configured to identify or otherwise detect surfaces within the field of view of the camera 24, for instance detecting planes in the images captured by the camera 24. These planes may be bounded by (and detected based on) the detected features, like the top of the table, the surface of a laptop, the surface of a display screen of the laptop, the surface of a display screen of a monitor, the side of a wall, or the like.

In some embodiments, a model of a user interface may include a list of identifiers that are associated with vertices of the user interface elements and features, such as anchor points in a point cloud, detected with the camera 24 or an augmented reality framework or library of the operating system 30. Some embodiments may access this index upon determining that a given anchor point appears within the field of view of the camera 24 to identify corresponding user interface elements in a scene model that are to be rendered.

Some embodiments may be configured to overlay the portions of the model that appear in the field of view of the camera 24 at positions determined by the location of the anchor points to which model elements, such as vertices or collections of vertices. For example, forming a three-dimensional object or polygon are associated, for instance, designated as having a fixed spatial relationship. In some embodiments, overlaying may include forming a new version of a frame of video in which pixels are replaced with values depicting the portion of a model determined to appear in the corresponding location. Some embodiments may further be configured to calculate shadows from the model on the scene, for instance, on one of the detected planes and modify pixel intensities in the shadow areas. Shadows may be implemented by making pixels darker based upon a downward projection of the model on the plane. Some embodiments may further be configured to calculate reflection of the model on detected planes, for instance modifying pixel colors to show a portion of the model, for instance, adjusting a red intensity to be greater responsive to determining that a reflection would occur from a red portion of a model on a plane within the scene.

The models may take a variety of different forms. Some embodiments may include a model of a two or three-dimensional keypad, like that described below with reference to FIG. 3. Some embodiments may include a two or three-dimensional white pad, for instance, with a matrix of icons that the user swipes among. In some embodiments, the model may include event handlers associated with the different elements within the model, like vertices, polygons, or objects. Some embodiments may execute the corresponding event handler upon determining that the user has touched a portion of the display screen of the mobile user computing device 12, depicting the corresponding object, polygon, or vertices vertex. In some embodiments, the event handlers may indicate to the native application 32 that the corresponding input has been received from the user, such as a letter or number typed into a keypad, on swipe, on touch, on touch release, or other event corresponding to a portion of the model.

In some embodiments, the model may be rearranged, for instance by adjusting a mapping between objects in the model and semantic values, like letters or numbers, or by rearranging positions of objects in the model. In some cases, the model may be rearranged dynamically with an animated transition through space, such as every user input. Thus, some embodiments may include, for example, a dynamically rearranged or remapped keypad or keyboard that adjusts after each user input.

In some embodiments, for some pose vectors, the model may not fit within an entire display screen 20 of the mobile user computing device 12. A user may manipulate the pose of the mobile user computing device 12 to view different portions of the model, which may display different portions of a user interface of the authentication native application 32. For example, the user interface may include an entire keyboard, and a user may translate the mobile user computing device 12 from left to right to view different keys on the keyboard in space.

In some embodiments, a user may enter a second credential, or a first credential, such as a password or pin code, in the augmented reality user interface via the native application 32. For instance, entering the credential may be done by touching locations of a display of the mobile user computing device 12 in which portions of a model appear, causing event handlers mapped to those portions of the model to be executed, and thereby entering a sequence of semantic values. In some embodiments, that sequence of semantic values may be sent by the authentication native application 32 to the authentication system 18. In some cases the sequence of sematic values may be sent along with an identifier of the mobile user computing device 12, a hardware or software fingerprint of the mobile user computing device 12, and features extracted from the field of view of the camera indicative of the user computing device 14 and information presented on the display 42 of the user computing device 14. Information presented on the display 42 may include values encoded in a machine-readable image described below, or features of the computing device indicative of the make and model of the computing device, e.g., a screen size of the computing device, aspect ratio of the computing device, classification of the computing devices being a laptop or desktop, keyboard layout of the computing device, touchpad arrangement and type or size of the computing device 14, or the like.

In some embodiments, the field of view of the camera 24 may be manipulated by information displayed by the user computing device 14 to make a given augmented reality session particularly robust and to convey additional information, such as a configuration of the user interface and validation or authentication information through another channel through the mobile user computing device 12. In some embodiments, the user computing device 14 may include a processor 34 and memory 36, storing operating system 38 and a web browser 40, or another native application configured to access a remote API for which authentication is sought. In some embodiments, the operating system 38 may be a desktop or a mobile operating system, which in some cases may be a different operating system from the operating system 30 of the mobile user computing device 12. In some embodiments, a user may have navigated the web browser 42, or a native application, and supplied user identifiers and credentials in accordance with this process, described below with reference to FIG. 2, before engaging the mobile user computing device 12 to supply a second factor of authentication.

In some embodiments, after a user supplies an identifier and a credential, like a password, or in some cases simply upon applying a user identifier, the web browser 40 may receive instructions to display a machine-readable code configured to facilitate the augmented reality session and in some cases convey information to the authentication native application 32. In some embodiments, the augmented reality session may be enhanced by providing, in the machine-readable image, a set of features designed to be detected as part of a point cloud relatively robustly by the augmented reality framework or library, examples including relatively high contrast, relatively granular and angular regions on display screen 42 of the user computing device 14. For instance, the display screen 42 may display white fields with various arrangements of black rectangles arranged over the display screen with dimensions that encode information. In another example, the features may be displayed non-concurrently on the display screen 42, for instance with a flashing pattern in which different features are displayed in different frames. In some embodiments, the machine-readable image may further include visual elements that encode machine-readable data conveyed to the authentication native application 32. Examples of visual element that encode machine-readable data are a barcode, a QR code, a pattern that is displayed on successive frames, for instance by flashing a pattern through successive frames, or other visual encoding. In some embodiments, the encoded information may include a cryptographically signed value from the authentication system 18, such as a value signed. The cryptographically signed value may be with a private cryptographic key associated with the public and cryptographic key stored in memory or otherwise accessible to the mobile user computing device 12, for instance receivable from the authentication system 18 via a side channel communication between the mobile user computing device 12 and the authentication system 18 upon scanning of the signature. In some embodiments, the encoded value may further include data that specifies a configuration of the augmented reality user interface, and the authentication native application 32 may parse these encoded configuration values and configure the authentication user interface, for instance selecting among the different types of user interfaces described above. In some embodiments, the encoded data may indicate an identifier of a user seeking authentication, and the authentication native application 32 may extract that identifier and send the identifier, or a value indicative of the identifier, to the authentication system 18 along with a user entered credential.

In some embodiments, the applications servers 16 may be one or more servers, for instance behind load balancers, at one or more web domains at which various web applications or application program interfaces of native applications are accessible. In some embodiments, the application servers 16 may be configured to send an initial user interface to a user computing device 14 after receiving a request to access resources, such as a web application or other application program interface. In some embodiments, the sent user interface may include web browser instructions, resources, scripting language commands, and the like that are executed by a web browser 40 to form the user interface on the user computing device 14 and cause the user interface to be displayed on display 42. In some embodiments, the user interface may include inputs, such as text box inputs, by which a user supplies a user identifier and a knowledge factor credential, e.g., a password. In some cases one or both of these values may be retrieved from a persistent client-side data repository, like a cookie, local storage object, SQL light database, or the like. For instance, the retrieval may be implemented by executing a corresponding portion of sent scripting language commands that retrieve these values and send them back to the application server 16. In some cases, upon a user computing device 14 requesting access resources, the application server 16 may redirect the web browser to the authentication system 18, or embed content from authentication system 18, that includes such a user interface. In some embodiments, the redirect command may include in a uniform resource identifier of the application server 16, among each of the application servers 16 serviced by the authentication server 18, along with a unique identifier. The unique identifier may track an authentication session such that subsequent interactions may be tied back to the application server 16 by the authentication system 18. The user's computing device may be redirected back to the appropriate application server 16 upon authentication by the authentication system 18, for instance by retrieving a uniform resource identifier of the appropriate application server 16 based upon the identifier in the redirect command sent to the web browser 40. This redirect command may cause the web browser 40 to execute a get request to the application server 18 that conveys that identifier. In some cases, upon authenticating the user, the web browser 40 may then be redirected again, for instance, sent another URL selected based upon the identifier of the application server 16. In some cases, that redirect command may include an authentication token as a query parameter in a URL sent to the web browser 40, which causes a web browser 40 then to send a request to the application server 16 including that authentication token. The authentication token may be a value cryptographically signed with a private key of the authentication system 18 and validated by the application server 16 based upon a public key and a cryptographic key corresponding to that private key. Thus, in some embodiments, a user may be authenticated by the authentication system 18 on behalf of a given application server 16 without direct communication between the application server 16 and the authentication system 18, by communicating via query parameters in URIs in redirect instructions into the web browser 40. Or in some embodiments, the application server 16 may communicate directly with the authentication system 18, for instance via a back channel communication via the network 19 that does not pass through the web browser 40. Thus, in some cases, the application server 16 may embed content sent to the web browser 40 or pass through content retrieved from the web browser 40, such as user credentials and identifiers sent to the authentication system 18. In some embodiments, the authentication system 18 may send a result of authentication to the application server 16 via this back channel communication.

Upon a user not being authenticated, in some embodiments, the application server 16 may decline to provide access to the requested resources by the user computing device 14, in some cases providing an indication of why access was not granted may be provided, for example, indicating that a user credential was incorrect. Alternatively, upon a user being granted access, for instance upon the user supplying the appropriate user identifier, knowledge factor credential, and demonstrating possession of the mobile user computing device 12, the application server 16 may then provide access to the requested resources, for instance by sending subsequent user interfaces containing information that would not otherwise be available and responding to subsequent commands, like various queries from the user computing device 14. In some embodiments, the user computing device 14 may be sent an authentication token that may be included in subsequent exchanges in a given authenticated session to indicate to the application server 16 that the subsequent request is part of an authentication's authenticated session. In some embodiments, when responding to subsequent requests, the application server 16 may validate that the subsequent request is associated with a valid authentication token. In some embodiments, these authentication tokens may be expired by the application servers 16 and cease to be honored, for instance after a given session ends or after a threshold amount of time has elapsed, in which case, the user may be forced to seek re-authentication with the techniques described above.

In some embodiments, the authentication system 18 may be configured to determine whether to authenticate a user on behalf of the application servers 16, for instance, with the exchanges described above via the web browser 40 or via direct exchanges with the application servers 16. In some embodiments, upon a user supplying an identifier, and in some cases upon a user supplying a knowledge factor credential, like a password, the authentication system 18 may cause the native application 32 to present an augmented reality user interface in which an additional input is supplied by the user. In some embodiments, that input may be a password, a pin code, a value displayed on the display screen 42, or some other input. In some embodiments, upon a user supplying their user identifier, the authentication system 18 may access the user profile and identify an address of the mobile user device 12 or of the authentication native application 32. The identified address, in some cases, may be a port and Internet protocol address. In some cases, the identified address may be a device identifier and application identifier registered through a notification service provided by a provider of the operating system 30 and to which the native application 32 has registered with the operating system 30. In some embodiments, messages from the authentication system 18 that cause the native application 32 to present an authentication user interface may be pushed or pulled.

In some embodiments, the authentication system 18 may include an authentication server 44, a machine-readable image generator 46, a risk scoring module 48, a credential validator 50, and a user profile repository 52. In some embodiments, these components may execute operations coordinated by the authentication server 44, for example, responsive to communications from the application servers 16, the user computing device 14, or the mobile user computing device 12. In some embodiments, the authentication server 44 may receive a message from an application server 16 or the user computing device 14 indicating a user identifier and user credential. In response, the authentication server 44 may access the user profiles repository 52 to identify a user profile corresponding to the user identifier and, in some cases, validate that a user supplied password is correct. In some embodiments, passwords or other credentials may not be sent by the user computing devices 12 or 14, but rather a value demonstrating possession of such a credential may be sent. For example, a cryptographic hash of a user credential may be sent instead of the user credential itself in plain text form, and some embodiments may determine whether a cryptographic hash value stored in memory of the authentication system 18 and a user profile matches the received cryptographic hash value. In another example, a value may be cryptographically signed based upon the user credential, and some embodiments may determine whether a public key corresponding to the user credential corresponds to the received value.

In some embodiments, the authentication server 44 may cause the authentication native application 32 to present the above-described authentication user interface on the display 20. The authentication server 44 may then receive from the authentication native application 32 a subsequent value entered by the user, such as another credential or value demonstrating possession of the user entered credential. In some embodiments, the authentication server 44 may then engage the credential validator 50 to determine whether the received second credential matches a value stored in a user profile in the user profiles repository 52.

In some embodiments, the machine-readable image generator 46 may generate the above-described machine-readable images. These images may include features that serve as anchor points for an augmented reality display and features that encode data conveyed to the authentication native application 32 via the display screen 42 in the camera 24, like cryptographic signatures and configuration keyvalue pairs encoded in QR codes or barcodes. In some cases, generating the machine-readable images may include forming a bitmap, such as of compressed bitmap, like a JPEG or PNG file, that is sent to the web browser 40. In some embodiments, generating the machine-readable image may include constructing a command with parameters that causes client-side executed code to generate the machine-readable image, for instance forming shapes with cascading style sheets commands or JavaScript or web assembly commands parametrically, or forming a barcode or QR code client-side.

In some embodiments, the authentication server 44 may request a machine-readable image from the machine-readable image generator 46 and send a responsive image to the web browser 40 for presentation on the display 42. In some embodiments, the authentication server 44 may include in a request to the machine-readable image generator 46 parameters to be conveyed to the native application, like those described above by which augmented reality user interfaces are configured or the image on the display 42 is authenticated, having been sent from the authentication system 18.

In some embodiments, the risk scoring module 48 may calculate a risk score based on hardware and software profiling of the user computing device 14 and the mobile user computing device 12. In some embodiments, user profiles may be associated with one or more hardware profiles of previously used computing devices and each of these profiles of hardware may include various attributes of those computing devices. These attributes may include Internet protocol addresses, medium access control addresses, processor makers, processor cache size, processor speed, memory size, member memory maker, operating system, operating system version, applications installed, application version, values in user agent strings from the web browser 40, and the like. In some embodiments, these attributes may further include visual attributes of the user computing device 14, such as values indicating an aspect ratio display screen, display screen size, keyboard layout, touchpad position or size, and the like. The images captured by the camera 24 may be processed to detect such features by the authentication native application 32, which may send values indicative of detected features to the authentication system 18. In some embodiments, the attributes may include three-dimensional attributes sense with a depth sensing camera of the mobile user computing device 12. In some embodiments, the attributes may include biometric attributes of a user entered into the mobile user computing device 12, like facial features or a fingerprint. In some embodiments, the risk scoring module 48 may determine the amount, such as number, like a weighted sum, of attributes of a computing device participating in authentication session that match attributes of a computing device previously mapped to a user profile in the profile repository 52. Some embodiments may determine a risk score based on an amount of matching, with greater correspondence to a lower risk. Some embodiments may determine whether the risk score satisfies a threshold, and upon determining that the risk score satisfies the threshold, authenticate the user responsive to other criteria being satisfied. Some embodiments may selectively request additional authentication factors upon the risk or satisfying a threshold (e.g. being above or below, depending upon the sign applied to the score).

In some embodiments, the credential validator 50 may be responsive to receive credentials pass to the authentication server 44, such as user credentials entered via the web browser 40 or the authentication native application 32, for instance via a augmented reality user interface. In some embodiments, the credential validator 50 may compare a received credential to a credential stored in a user profile in user profile repository 52 corresponding to a user identifier associated with the request for authentication. In some embodiments, as noted, values indicative of possession of a user credential may be received, and in some embodiments the credential validator 50 may by validate that the user has demonstrated possession of the user credential without actually obtaining the user credential itself in plain text form.

In some embodiments, the user profiles repository 52 may store a plurality of user profiles, for example in a relational or noSQL database. In some embodiments, each user profile may include a user identifier for a given user on a given application server 16, or in some cases, the same user identifier may be shared across multiple application servers 16 posting multiple web applications or other application program interfaces. In some embodiments, each of these user identifiers may be associated with a corresponding knowledge factor credential, like a password or other value by which a user demonstrates possession of the knowledge factor credential. Examples include a salted cryptographic hash calculated based upon a user password, such that the user password is not stored in the user profile, but a corresponding cryptographic hash value sent by the web browser 40 may be compared against the cryptographic hash value in the user profile to determine whether the user is in possession of the knowledge factor credential, for instance upon the web browser 40 calculating the cryptographic hash value from a user supplied password or from a password stored in client-side memory. In some embodiments, the user profiles include computing device profiles, for example for a given user, corresponding to the user computing device 14 and the mobile user computing device 12. In some embodiments, each user profile may include one or more, for example two, three, five or more computing device profiles, e.g., 2, 3, 5 or more. In some cases each computing device profile may include the information described above by which a configuration of hardware and software on a computing device may be fingerprinted, and in some cases, descriptors of collections of features detected in images of one of the computing devices by another computing device. The features may include an image captured by the mobile user computing device 12 that may be classified as including the user computing device 14 or another user computing device associated with the user in the user profile, or not including one of these previously associated computing devices. In some embodiments, the above-described risk scores may be elevated responsive to a determination that the visual appearance of a computing device or the computing device profile otherwise does not match that of a computing device previously used by the corresponding user of a user profile. In some cases, this is based on a weighted combination of mismatching attributes. For instance, higher weights may be applied to attributes that are less likely to change over time, like a central processing unit manufacturer, a central processing unit model number, and with lower weights applied to values that are more likely to change over time, for instance a version of software (though some embodiments may apply a higher weights in cases in which a version number of software decreases rather than increases relative to cases in which the version number increments are higher).

Figure 2:
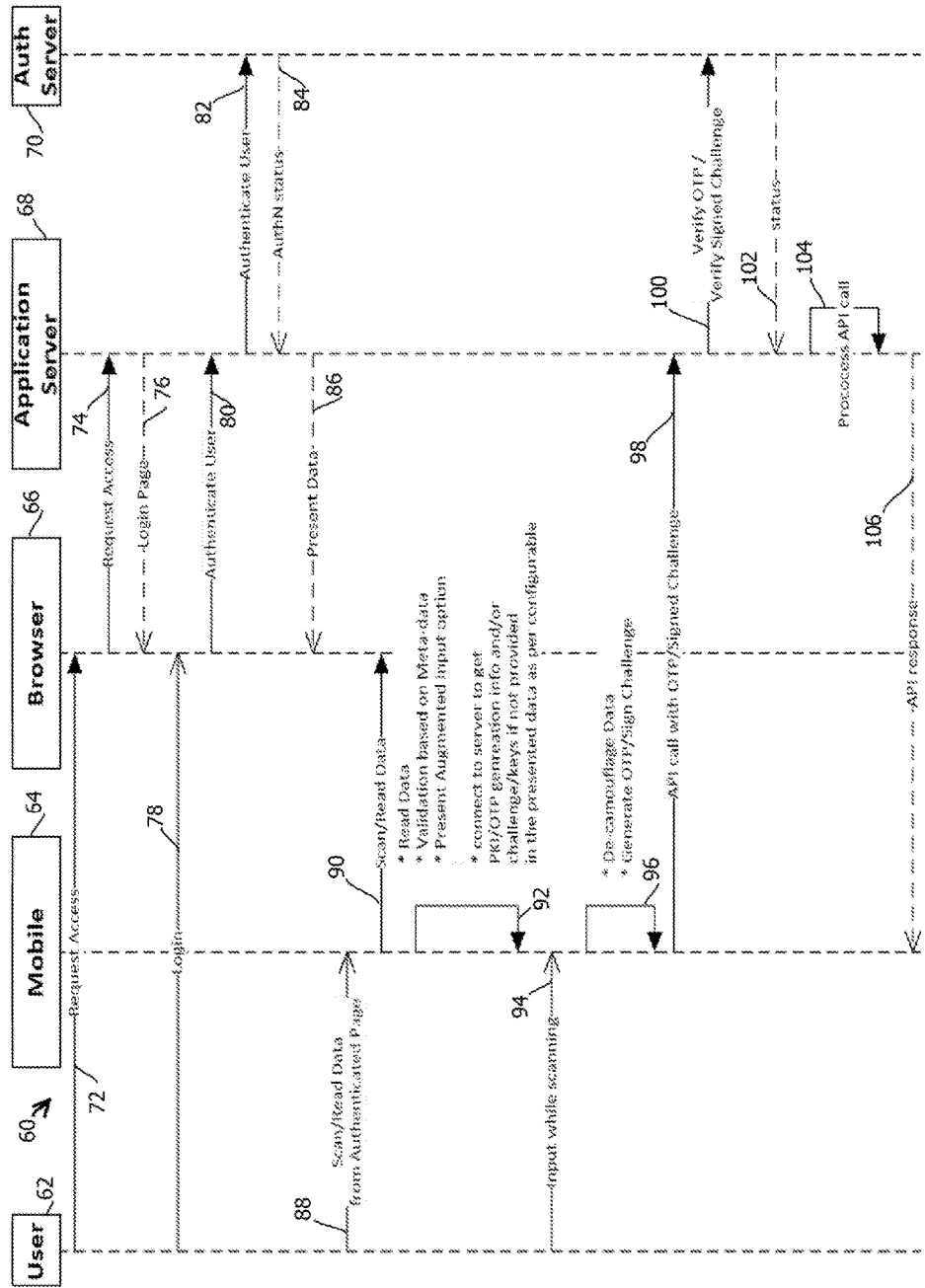
FIG. 2 is a multi-entity flowchart showing messages that may be passed when authenticating a user with the system of FIG. 1 in accordance with some embodiments of the present techniques.

FIG. 2 shows an example of a process 60 that may be implemented in the computing environment of FIG. 1, but which is not limited to that implementation, which is not to suggest that any other description herein is limiting. In some embodiments, the functionality of the process of FIG. 2, and the other functionality described herein may be implemented by storing program code on a tangible, non-transitory, machine-readable medium, such that when the instructions in the program code are executed by one or more processors, the described functionality is effectuated. In some cases, different subsets of the program code may be stored on different instances of media, for instance on different computing devices the execute different subsets of the instructions, an arrangement that is consistent with the use of the singular term "medium" as used herein. In some embodiments, the described operations may be executed in a different order, may be replicated, may be executed sequentially, may be executed concurrently, may be omitted, may be replicated, or may be otherwise differently arranged from that shown in FIG. 2, which is not to suggest that any other description is limiting.

In this example, one human entity, user 62, is shown as participating in the process along with four different computing device entities, a mobile computing device 64, a web browser 66 on another computing device different from the mobile computing device 64, and application server 68, and an authorization server 70. In some embodiments, the user 62 may be a user of the computing devices 12 and 14 described above with reference to FIG. 1. In some embodiments, the mobile computing device 64 may be the mobile user computing device 12 described above, and the browser 66 may be the web browser 40 described above. In some cases, the application server 68 corresponds to the application servers 16 of FIG. 1, and the authorization server 70 is part of or implements the authentication system 18.

In some embodiments, the process 60 begins with a user interacting with the browser 66 to request access to resources available remotely over a network, as indicated by communication 72, which in some cases may include a user selecting a link or navigating the web browser in some other fashion. In some cases, the role the browser 66 may be filled by a native application that accesses a remote application program interface.

Next, in response to the user's request, the browser may request access to the resources from the application server 68, as indicated by communication 74, for instance, by sending a get request to an Internet protocol address of the application server 68 indicated by a domain name service as corresponding to a uniform resource locator specified in the communication 72.

In some cases, upon receiving the request for access, the application server 68 may determine whether the request is associated with a currently authenticated session with the browser 66. In some cases, this may include determining whether an authentication token is appended to the request 74, for instance as a query parameter, and determining that such an appended authentication token corresponds to a valid authenticated session, such as one that is not been expired, and corresponds to a list of authentication tokens that are valid stored in memory of the application server 68. Or in some cases, techniques like those described above by which a value demonstrate in possession of a password may be used in place of sending the actual authentication token, for instance the application server 68 may receive a cryptographic hash value calculated based on an authentication token, or the requested access may be signed by a private key corresponding to the session held by the browser 66, and the application server 68 may verify the signature with the public key corresponding to the session provided to the application server 68 by the authorization server 70 in an earlier authorization. Upon determining that the request for access 74 is associated with an already authenticated session, in some cases, the application server 68 may send the requested resources, such as webpage content, files, application program interface request responses, or the like, back to the application executing client-side, such as the browser 66. In the illustrated example, the application server 68 determines that the request for access 74 is not part of a currently authenticated session. In response, the application server 68 may respond by sending instructions to the browser 66 to display a user interface by which the user 62 may enter various user credentials, such as hypertext markup language instructions, scripting language instructions (e.g. JavaScript or web assembly), and various other resources, like images and styling instructions, back to the browser 66. In some embodiments, those instructions may include user interface inputs having corresponding event handlers configured to send data entered into the user interface inputs by the user 62 back to the application server 68 upon a corresponding event being sent to the event handler by the browser 66. Events may include an on click event, a key entry event, and on touch event, a touch release event, or other input gestures. In some cases, the instructions may include instructions that obtain other types of user credentials, such as a value indicative of a biometric measurement, e.g., one or more features in a facial scan or a fingerprint scan, or a cryptographic hash value or cryptographic signature sent by the client device responsive to the request or by some other third-party biometric authentication service responsive to the request, back to the application server 68.

In the illustrated example, the user may enter their credentials, as indicated by the communication 78, into the initial user interface sent by the application server 68. For instance, the user may enter a username and password, or allow various biometric attributes of the user 62 to be scanned or otherwise submitted. In some embodiments, values indicative of the communication 78 may be sent by the browser 66 back to the application server 68, as indicated by communication 80. In some cases, this may be the values themselves or various cryptographic hash values or encrypted encodings of these values.

In some embodiments, the application server 68 may then establish a back channel of communication with the authorization server 72 and request authentication of the user based on the supplied values and communication 80. In some cases, the application server 68 may be configured to hand off the entire authentication process to the authorization server 70 without establishing a back channel of communication. An example of such is by implementing an OAuth protocol, such as in the OAuth 2.0 specification, the contents of which are hereby incorporated by reference. In some embodiments, the application server 68 may request authentication in communication 82 with a message or sequence of messages that include the user supplied credentials, user supplied values demonstrating possession of the credentials, or a value demonstrating possession of the credential by the application server 68, without revealing the actual credential itself. In some embodiments, the request to authenticate the user 62 may include one or more the attributes described above by which a computing device executing browser 66 may be profiled. Examples of such may include parameters in a user agent string in a hypertext transport protocol request from the browser 66 to the application server 68, or various other parameters gathered by a native application by querying an application an operating system interface executing on the client device running browser 66.

In some embodiments, in response, the authorization server 70 may identify a user profile corresponding to a user identifier supplied by the user via the browser 66 (or by a native application on a client device). In some embodiments, the process 60 may then include the authorization server 70 determining whether supplied knowledge factor user credentials, or values demonstrating possession thereof, correspond to values in the user profile, for instance, determining whether the user has demonstrated that they are in possession of a password associated with the user identifier in the user profile. Some embodiments may further determine whether a computing device profile of the computing device executing the browser 66 matches a profile of a computing device stored in the user profile matching the user identifier. In some cases, this may include calculating a risk score based on an amount of attributes that match and various weights corresponding to different attributes and types of matches or mismatches. Some embodiments may determine whether the risk score exceeds a threshold, and in response to determining the risk or exceeds a threshold, determined to obtain supplemental authentication factors, for instance determining to verify that the user is in possession of the mobile computing device 64 associated with the user in the user profile. In some cases, additional authentication factors may be obtained regardless of the risk score, which is not to suggest that any other description herein is limiting.

In some embodiments, the above-described determination of whether the request for access 74 may be a part of a currently authenticated session made by the authorization server 70. In some cases, that task may be offloaded to application server 68. In some embodiments, the authorization server 70 may send a communication 84 back to the application server 68 indicating that the user is not currently authenticated and instructing application server 68 to instruct the browser 66 (or native application) to present the above-describe machine-readable image sensed by a camera of the mobile computing device 64. In some cases, the authorization server 70 may form a bitmap of an image that is sent to the application server 68, which may forward that bitmap to the browser 66. In some cases the authorization server 70 may parametrically describe the image. For example, the image may be described with a sequence of key value pairs that specify attributes that can be communicated via the image, and the image may be formed in a bitmap by the application server 68 or the browser 66 responsive to these parameters. This particular implementation is expected to use less network bandwidth than systems that convey a bitmap. In some embodiments, the machine-readable image may be formed responsive to attributes in a user agent string sent by the browser 66. For example, the attributes may indicate a window size or a display size, based on a horizontal and vertical dimension thereof. In some embodiments, visual elements may be scaled responsive to these attributes, or some embodiments may encode more or less data, responsive to the display or window size, with more information being encoded in larger displays. In some embodiments, the machine-readable image may be encoded to provide a relatively consistent (for example within plus or minus 50%) actual display size representation of the image that is independent of pixel pitch of the display of the client device executing the browser 66, for instance, causing a relatively large image to be selected responsive to a relatively small pixel pitch and vice versa, thereby providing for a relatively consistent distance between the mobile device 64 and the screen displaying the browser 66 that is within a range of distances that will be comfortable for the user and within a range of acceptable focal lengths of a camera of the mobile computing device 64, for instance between 5-50 inches, like between 7-24 inches.

In some cases, the application server 68 may then cause the browser 66 to present this data, for instance with communication 86, which in some cases may include a communication responsive to communication 80 that encodes a new webpage that displays the machine-readable image. In some embodiments, this may cause the client computing device executing the browser 66 to display the machine-readable image. In some cases, this display may include instructions to the user that are human readable, for instance or in plain text in natural language. In some cases, these instructions may include instructions that tell the user to supply a supplemental authentication factor with their mobile computing device. Or in some cases, a communication may be sent to the mobile computing device 64, such as a notification via a notification application program interface provided by a provider of an operating system of the mobile computing device, for instance to which a background process of the above-described native application has subscribed. In some cases, this notification may cause a notification to be presented on the mobile computing device by which a user may launch an authentication native application like that described above. (Or in some cases, the functionality of the authentication native application may be implemented in a web browser executing on the mobile computing device 64).

In some embodiments, the user may launch the authentication native application, as indicated by communication 88, and physically position a camera of the mobile computing device 64 such that the display screen of the computing device executing the browser 66 is within a field of view of the camera, as indicated by communication 90, which may include capturing video or one or more still images of the display screen of the browser, which may depict the machine-readable image described above.

In some embodiments, the mobile computing device 64 may execute a native application that sequentially analyzes each frame of video from the camera to determine whether the frame includes features corresponding to a machine-readable image from the authorization server 70. In some cases, this may include accessing a plurality of feature descriptors stored in memory and comparing those feature descriptors to pixel intensities of the frames a video. In some cases, comparing may include implementing a convolution comparison by which a feature descriptor, for instance a pattern of ranges of pixel intensities that match the feature within a subset of the pixels is matched to a subset of the pixels in the frame. Some embodiments may raster this feature descriptor across the pixels in the frame, for instance left to right top to bottom, determining whether any subset of the pixels match the feature descriptor, in some cases with a stride that spans a plurality of pixels but causes multiple attempts at matching across a given vertical or horizontal pass. In some embodiments, the matching may be scale invariant. For instance, the convolution matching may be applied in multiple iterations applying different scaling to the pattern or the frame of pixels, for instance scaling the matching pattern from a minimum size up to a maximum size in 2, 5, or 10 increments, e.g., linearly. Some embodiments may further include feature descriptors that are orientation independent to some degree. For instance, in some cases, the above-described convolution process may be applied to different patterns that vary based on a relative orientation, such as an angle of the camera relative to the display screen. In some embodiments, each attempt at matching to a subset of the frame may produce a score indicative of an amount of pixels in the subset of the frame that fall within a range specified by the pattern at a current location, scaling, and orientation corresponding to the given attempted a match. Some embodiments may determine whether this score exceeds a threshold (or is less than a threshold depending upon sign), and upon detecting that the threshold is satisfied, designate the feature as being present within the frame. In some cases, the mobile computing device 64 may execute a convolution deep neural network trained on a relatively large number, such as more than a thousand, or more than 10,000, images containing a subset of the features in the machine-readable image. Some embodiments may determine based on an activation output signal from at least some of a layer of the neural network whether the machine-readable image is within the frame and a location of the machine-readable image within the frame. In some cases, a subset of the features in the machine-readable image may be session independent. For instance, the same subset of features may be presented to every mobile computing device seeking to confirm authentication. As such, a neural network may be configured and otherwise trained to recognize these features, while down waiting other attributes of the machine-readable image that may vary between different sessions.

In some embodiments, the client computing device may include an application specific integrated circuit (e.g., an AI co-processor ASIC) that cooperates with a physically separate or integrated central processing unit to analyze frames of video (and depth-camera readings) in the manner described herein. In some cases, the ASIC may include a relatively large number (e.g., more than 500) arithmetic logic units configured to operate concurrently on data. In some cases, the ALU's may be configured to operate on relatively low-precision data (e.g., less than or equal to 16 bits, 8 bits, or 4 bits) to afford more parallel computing units per unit area of chip substrate. In some cases, the AI co-processor ASIC may have an independent memory interface (relative to the CPU) to memory, and in some cases, independent memory from that accessed by the CPU. In some cases, the interface may be to High Bandwidth Memory (HBM), e.g., as specified by the JEDEC HBM2 specification, that includes a 3-dimensional stack of dynamic random access memory. In some cases, the memory accessed by the AI-co-processor ASIC may be packed in a multi-chip package with such a 3-dimensional stack of memory, e.g., on a shared package substrate that connects to the CPU via a system board.

In some embodiments, upon identifying the machine-readable image within a frame of video, some embodiments may extract information encoded in the machine-readable image with routines executing on the mobile computing device, for instance in the native application. In some cases, this may include identifying a barcode or QR code or performing optical character recognition on the image. In some embodiments, upon detecting the machine-readable image based on the session invariant features, some embodiments may determine a pose of the camera relative to the display screen of the computing device executing browser 66, such as a vector indicating a difference between a normal vector of the display screen and a centerline of a camera of the mobile computing device 64. Based on this pose vector, some embodiments may calculate a transformation of the frame of video, for instance a perspective transformation, a scaling transformation, or an affine transformation. In some cases, the transformation may transform the frame of video into a representation in which the image appears as it would when the camera is oriented normal to the surface of the display screen of the computing device executing the browser 66 and aligned with the center of the display screen. Some embodiments may then extract the machine-readable image encoded data from a designated subset of this transformed image, for instance, in a rectangular area in which the barcode or QR code consistently appears after this transformation. This is extraction is expected to reduce dependency on how the mobile device 64 is positioned in space relative to the browser 66 and screen sizes and focal lengths and regulations of cameras.

In some cases, the extracted data encoded in the machine-readable image may include an identifier of the authorization server and a value demonstrating possession by the authorization server 70 of an authorization server credential. Examples of these values are a value that is cryptographically signed with a private encryption key of the authorization server and corresponding to a public encryption key stored in memory of the native application, or a value that is otherwise secret. In some embodiments, the value encoded may be a value selected based on a mobile computing device associated with the user requesting authentication in the user profile. For example, the authorization server 70 may encode a different value that uniquely identifies different mobile computing devices associated with different users in the machine-readable image, such that the encoded value serves as a global unique identifier of the mobile computing device 64 and a namespace of the authorization server 70. The unique value, which in some cases may be a relatively high entropy value that is relatively difficult to guess, such as a random string greater than 256 bytes, may be stored in memory allocated to the native application executing on the mobile computing device 64. In some embodiments, the mobile computing device may determine, with a native application, whether the encoded value matches before proceeding, thereby making it difficult for third-party attackers to scan the image with a different mobile computing device, such as one in which a user's phone number has been maliciously remapped to an attacker's mobile computing device.

In some embodiments, the machine-readable image may further encode a value demonstrating possession of a credential of the authorization server 70, as noted above. Some embodiments may further validate, with the native application executing on the mobile computing device 64, that the machine-readable image is authentic and from the authorization server 70 and not from an attacker's computing system, such as one implementing a man-in-the-middle attack and supplying a substitute machine-readable image.

In some embodiments, upon determining that the machine-readable image is not authentic, for instance doesn't correspond to the mobile computing device 64 or doesn't correspond to the authorization server 70, based on values encoded in the machine-readable image, the mobile computing device may terminate the process 60 and admit an alarm, for instance sending an alarm to the authorization server 70, displaying a warning message to the user, and otherwise preventing the authorization server 70 from authenticating the user.

Alternatively, upon determining that the data encoded in the machine-readable image is authentic and otherwise valid, the native application on the mobile computing device 64 may present a user interface to the user 62 by which the user may supply additional credentials. In some cases, this may include the mobile user computing device 64 connecting to the authorization server 70 and indicating that the mobile computing devices engaged in an attempt to authenticate a user. In some cases, authentication may be with a value that uniquely identifies the mobile computing device 64, like the value described above that serves as a global unique identifier, or a value demonstrating possession of that value. In some embodiments, the authorization server 70 may determine whether the request matches a previously sent machine-readable image and upon determining the absence of a match, the authorization server 70 may terminate an ongoing session by which a user is attempting to become authenticated. Alternatively, in some cases, the server 70 may return parameters by which the mobile computing device 64 may supply additional credentials. The additional credentials may be an encryption key with which the mobile computing device 64 is to encrypt or cryptographically hash a user supplied credential, or parameters by which a one-time password is generated, or a public or private encryption key. Or in some cases, some or all of these parameters may be encoded in the machine-readable image, for example in an encoded encrypted ciphertext, and the mobile computing device 64 may decrypt these values with a previously exchanged encryption key from the authorization server 70.

In some embodiments, these communications with the authorization server 70 or the values encoded in the machine-readable image, may also specify a configuration of a user interface to be displayed by the mobile computing device 64 and receive additional credentials from the user 62. In some embodiments, these parameters may include a type of user interface, such as a keyboard, a swipe pattern (like a matrix, such as a two or three-dimensional matrix of icons between which the user sequentially swipes to enter a pattern), or other inputs by which a user may enter a relatively high entropy credential.

In some embodiments, the user interface displayed by the mobile computing device 64, as indicated by action 92, may be an augmented reality user interface like that described above and explained in greater detail below with reference to FIG. 3. In some embodiments, the user 62 may input a user credential, like a supplemental password or PIN code or swipe pattern into the displayed user interface, for instance by touching icons appearing on a screen of the mobile computing device 64, as indicated by input 94. In some embodiments, the user interface of the mobile computing device 64 may decode information presented on a display screen of the browser 66, for instance decrypt that information displayed on the mobile computing device 64, in some cases, in positions overlaid on where it would otherwise appear on the display screen of the computing device executing the browser 66, and in some cases, the supplemental user credential may be entered into the computing device executing the browser 66, with the user viewing a decoded version of the user interface via the display screen of the mobile computing device 64, for instance semantic values, like characters, mapped to a keyboard on a display screen of the browser 66 may be remapped in a version presented in augmented reality on a display screen of the mobile computing device 64. Then the user may select those keys by touching the display screen of the browser or selecting within the display screen of the browser 66 to choose the values shown on the display screen of the mobile computing device 64. Or in some cases, input may be entered via a representation of the user interface on the mobile computing device 64.

In some embodiments, as indicated by operation 96, the user interface on the mobile computing device 64 may be rearranged as the user enters the credential. The rearrangement may occur after each successive semantic value, like each successive character or icon selection, is made by the user. For example, some embodiments may rearrange the semantic values mapped to keys on the keyboard, rearrange a dot pattern, or otherwise rearrange the user interface to make it difficult for someone looking over the user shoulder to discern the supplemental credential supplied by the user and impair attacks by which residual heat from the user's finger touching the screen is detected on a screen of the mobile computing device 64 with the thermal imaging camera.

In some embodiments, the authentication native application may receive a value from the authorization server 70 to be matched to a user supplied credential, such as a supplement, a pin code or password or cryptographic hash thereof. In some cases, the native application existing on the mobile computing device 64 may determine whether the user input credential matches the supplied value. Or in some cases, the user supplied value may be sent from the mobile computing device 64, or value demonstrating possession thereof, to the authentication server 70, which may determine whether the user-supplied value matches that stored in a user profile.

Upon determining that the user supplied value does not match that stored, either the mobile computing device, the authentication server 70, or both, may terminate the process 60 and admit the various alarms described above as associated with a failed authentication attempt.

Alternatively, some embodiments may send a message to the application server 68 indicating that the user is authenticated. In some cases, this may include the mobile computing device 64 sending a one-time password or assigned challenge to the application server 68. The assigned challenge may have a parameter, such as a secret value, sent by the authentication server 70 to the application server 68 in the communication 84 and associated with the authentication session. In some cases, the parameter may be a cryptographically signed authentication token that is signed with a private encryption key of the authentication server 70 and associated with the public cryptographic key held by the application server 68 and used by the application server 68 to determine that the authentication token is valid and was issued by the authorization server 70.

In some embodiments, the application server 68 may look to the authentication server 70 to determine whether the sense value is authentic from communication 98, for instance by sending a verification request in communication 100 through a back channel communication to the authentication server 70. In some embodiments, the authentication server 70 may determine whether the sign challenge, one-time password, or other type of authentication token is valid, for instance is consistent with the previous portions of the session, for example, contains a unique, relatively high entropy identifier issued by the authentication server 72 of the mobile computing device 64 and conveyed through communication 98. Upon determining that the communication 98 contains sufficient information to demonstrate a completed authentication process, some embodiments may send a message to the application server 68 indicating that the user operating the browser 66 is authenticated, or a communication indicating that the user is not authenticated if the values do not match, as indicated by communication 102. Responsive to this communication, the application server 68 may determine whether to signal to the mobile computing device 64 that the authentication was successful, as indicated by communication 106. In some cases, the mobile computing device 64 may provide indication to the user responsive to this communication indicating a result. In some embodiments, upon a failed authentication, the application server 68 may decline to provide the access requested in communication 74. Alternatively, upon determining that the authentication attempt was successful, the application server 68 may provide access to various remotely host resources to the browser 66, or other native application, for instance various software as a service web applications or various remotely hosted application program interfaces by which one or more databases may be accessed to retrieve data or write data with the computing device executing the browser 66.

Figure 3:
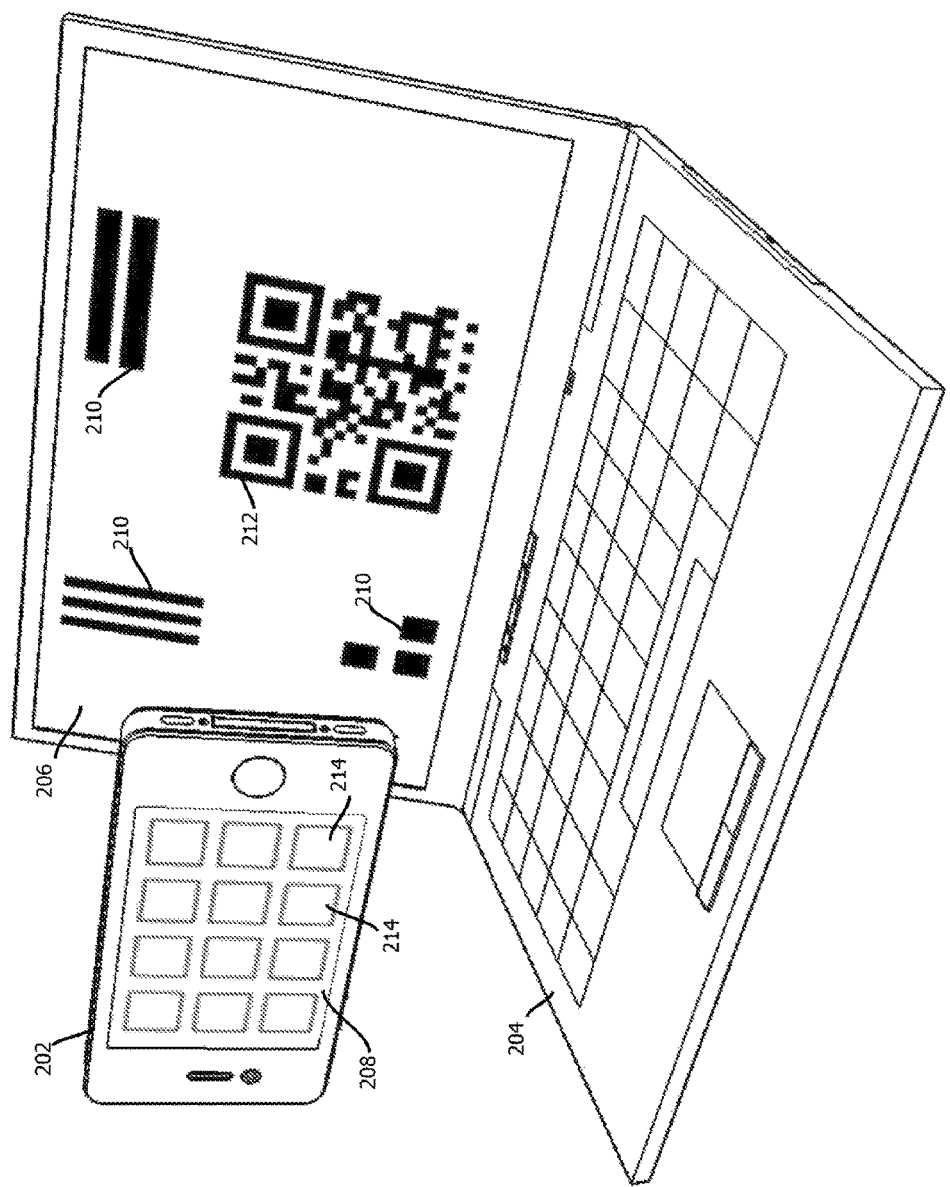
FIG. 3 is a perspective line drawing showing an example of user interfaces on a mobile computing device and a laptop computing device with the system of FIG. 1 in the process of FIG. 2 in accordance with some embodiments of the present techniques.

FIG. 3 shows an example of a use case in which an augmented reality user interface on a mobile computing device 202 is used to provide a supplemental factor in a session in which the other computing device 204 is requesting authenticated access to remote posted resources. In this example, the computing device 204 is displaying a machine-readable image 206. In this example, the machine-readable image 206 includes various features 210 configured to provide relatively robust features detectable by an augmented reality library or framework of an operating system of the mobile computing device 202 and provide relatively robust anchor points for determining an augmented reality overlay of a video feed. Further, the machine-readable image 206 includes a QR code 212 that may encode various values like those described above by which the machine-readable image 206 is authenticated to the mobile computing device, the mobile computing device 202 is uniquely identified, and the augmented reality user interface is configured. The illustrated augmented reality user interface 208 includes a plurality of icons 214 that are user selectable and are associated with event handlers that cause corresponding semantic values to be appended to a user-entered credential sent back to an authentication server like those described above. In some embodiments, the position of the icons 214, shape of the icons 214, and size of the icons 214 may vary responsive to the relative pose of the mobile computing device 202 and the display screen 206. For instance, the icons 214 may be overlaid as if they were positioned in space between the computing device 202 and the display screen 206 and static in that space, regardless of movement of the computing device 202 relative to the computing device 204.

Figure 4:
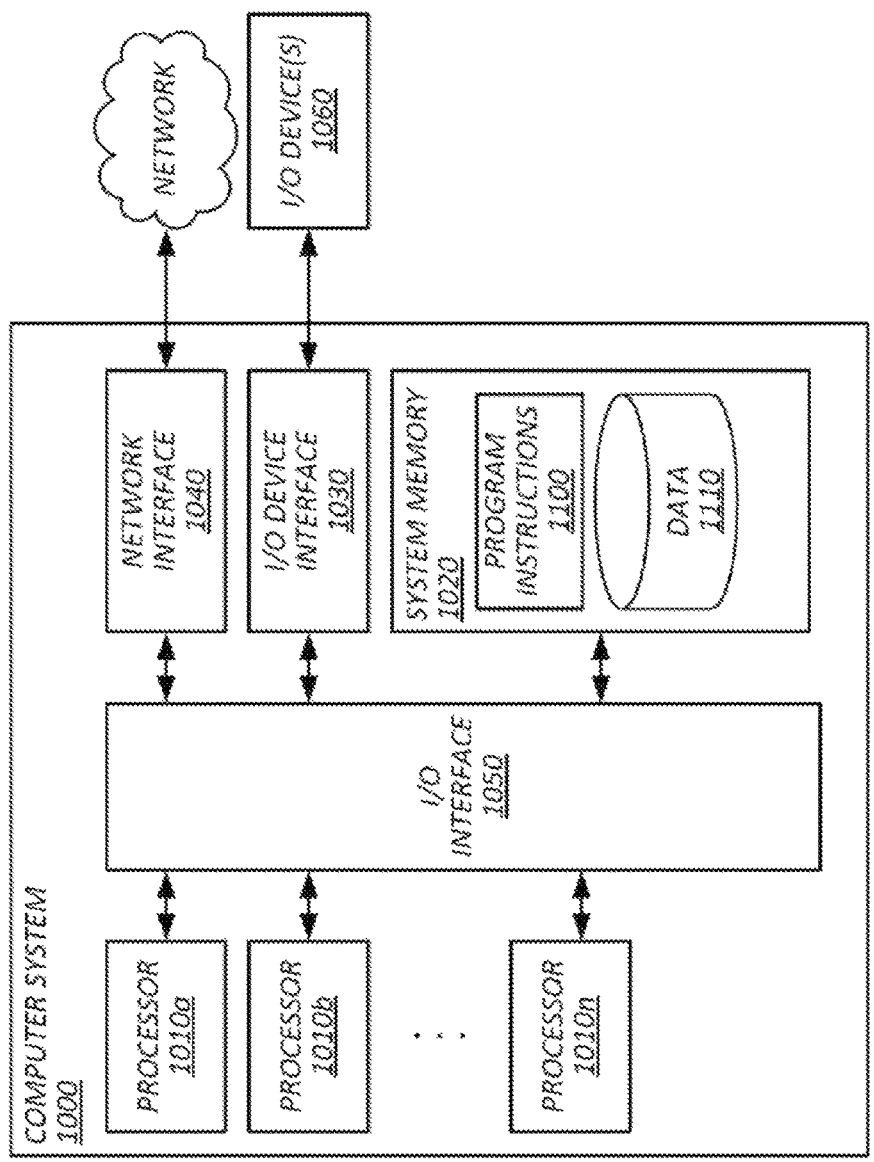
FIG. 4 shows an example of a computer system by which the above techniques may be implemented.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-

1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A tangible, non-transitory, machine-readable medium storing instructions that when executed by one or more processors effectuate operations comprising: receiving, with one or more processors, from a first computing device, via a network, a request to authenticate a user to access resources over a network with the first computing device; receiving, with one or more processors, from the first computing device, via a network, a user identifier associated with the request to access resources; in response to receiving the request, sending, with one or more processors, instructions that cause the first computing device to display a machine readable image, wherein: the machine readable image is configured to, upon being sensed with a camera of a second computing device, cause the second computing device to present, with a display of the second computing device, a user interface with a user-credential input configured based on the machine readable image displayed by the first computing device; receiving, with one or more processors, from the second computing device, a value demonstrating possession of a user credential and an identifier of the second computing device, the user credential being entered into the second computing device via the user interface configured based on the machine readable image displayed by the first computing device; determining, with one or more processors, to authorize the user to access resources over the network with the first computing device, at least in part, by: determining, based on the identifier of the second computing device, that the second computing device is registered in a user profile to a user corresponding to the user identifier received from the first computing device; and determining that the value demonstrating possession of the user credential received from the second computing device is valid; and in response to the determination, causing, with one or more processors, the user to be granted access to the resources over the network with the first computing device.

2. The medium of embodiment 1, wherein: the operations comprise causing, with a native authentication application executing on the second computing device, the second computing device to sense the machine readable image with a camera of the second computing device; the operations comprise receiving data indicative of a video feed from the camera with the native authentication application executing on the second computing device; and the machine readable image causes the native authentication application executing on the second computing device to present an augmented reality user interface in which the position of at least some user inputs in the augmented reality user interface on the display screen of the second computing device change upon changes in relative orientation or position of the first computing device and the second computing device.

3. The medium of embodiment 2, wherein: some visible features of the user interface on the second computing device are features appearing in video frames of video captured by the camera of the second computing device; and other visible features of the user interface on the second computing device are represented as overlaid on the frames of video, the other aspects corresponding to at least some user inputs in the user interface.

4. The medium of embodiment 2, wherein: the user interface comprises 9 or more user inputs that are spatially rearranged relative to one another in the user interface automatically at least once in response to entry of part of the user credential via the user interface.

5. The medium of embodiment 2, wherein: the user interface comprises 6 or more user inputs that are visually remapped to different semantic values in the user interface automatically a plurality of times in response to respective entries of respective parts of the user credential via the user interface; and the user credential includes a sequence of the semantic values.

6. The medium of embodiment 2, wherein: the user interface comprises an on-screen keypad or keyboard with key positions that are rearranged relative to one another during entry of the user credential.

7. The medium of any one of embodiments 2-6, wherein: the user interface comprises an on-screen arrangement of user inputs selectable by a sequence of gestures input into the second computing device.

8. The medium of any one of embodiments 2-7, wherein: user interface is larger than a display screen of the second computing device and the second computing device is configured to display different portions of the user interface responsive to spatial reorientation of the second computing device.

9. The medium of any one of embodiments 1-8, wherein: the machine readable image or sequences of machine readable images comprising the machine readable image comprise: a first set of features corresponding to anchors by which the second computing device determines a pose of the second computing device relative to the machine readable image; and a second set of features that encode a value by which the second computing device authenticates at least part of the machine readable image.

10. The medium of embodiment 9, wherein: the second set of features comprise a cryptographic signature signed with a private cryptographic key of an authentication system and corresponding to a public cryptographic key of the authentication system accessible to the second computing device; and authenticating at least part of the machine readable image comprises verifying that the encoded value includes a cryptographic signature formed with the private cryptographic key based on the public cryptographic key.

11. The medium of any one of embodiments 1-10, wherein: the machine readable image encodes a value that distinguishes the machine readable image from other machine readable images sent to other computing devices requesting authentication; the value that distinguishes the machine readable image from other machine readable images sent to other computing devices requesting authentication is received from the second computing device after the machine readable image is sent to the first computing device; the value demonstrating possession of the user credential is received in association with the value that distinguishes the machine readable image from other machine readable images sent to other computing devices requesting authentication; and determining to authorize the user comprises validating that the received value that distinguishes the machine readable image from other machine readable images sent to other computing devices requesting authentication matches the machine readable image sent to the first computing device.

12. The medium of embodiment 11, wherein: the value that distinguishes the machine readable image from other machine readable images is a non-plain-text encoding of a one-time password.

13. The medium of embodiment 11, wherein: the value that distinguishes the machine readable image from other machine readable images is a plain-text encoding of a one-time password appearing in the machine readable image and entered into a user interface of the second computing device by the user.

14. The medium of any one of embodiments 1-13, wherein: the value demonstrating possession of the user credential is received in association with data encoding attributes of a visual appearance of aspects of the first computing device other than the machine readable image being displayed; and determining to authorize the user comprises classifying the data encoding attributes of the visual appearance as consistent with a visual appearance of computing device previously used by the user.

15. The medium of any one of embodiments 1-14, wherein: displaying the user interface comprises: detecting a plane of a display screen of the first computing device; determining vertices of a polygon on the a plane of the display screen of the first computing device; identifying an anchor on the a plane of the display screen of the first computing device based on a visual feature appearing in a frame from the camera; determining an affine transformation or a projective transformation of one or more user interface elements onto the detected plane; determining a display position on the second computing device based on a location of the anchor in the display of the second computing device; and causing the affine transformation or projective transformation of the one or more user interface elements to be displayed at least partially occluding the frame of video from the camera displayed on the display screen of the second computing device at the position determined relative to the anchor; and the affine transformation or the projective transformation further comprises a transformation based on a translation matrix indicative of relative translation of the second computing device relative to the first computing device and a transformation based on a rotation matrix indicative of rotation of the second computing device relative to the first computing device, the translation matrix and the rotation matrix being determined based on both measurements from an inertial measurement unit of the second computing device and a point cloud of features detected in the video feed.

16. A tangible, non-transitory, machine-readable medium storing instructions that when executed by one or more processors effectuate operations, comprising: causing, with one or more processors of a mobile computing device, with a native authentication application executing on the mobile computing device, the mobile computing device to sense a machine readable image on a display of another computing device with a camera of the mobile computing device; receiving data indicative of a video feed from the camera with the native authentication application executing on the mobile computing device; identifying an authentication server based on an identifier encoded in the machine readable image; and presenting an augmented reality user interface in which positions of at least some user inputs in the augmented reality user interface on a display screen of the second computing device change upon changes in relative orientation or position of the first computing device and the second computing device; and receiving, the mobile computing device, the user credential entered into the augmented reality user interface; sending, from the mobile computing device, to the identified authentication server, via a network, a value demonstrating possession of the user credential.

17. The medium of embodiment 16, wherein: some visible features of the user interface on the second computing device are features appearing in video frames of video captured by the camera of the second computing device; and other visible features of the user interface on the second computing device are represented as overlaid on the frames of video, the other aspects corresponding to at least some user inputs in the user interface.

18. The medium of embodiment 16, wherein: the user interface comprises 9 or more user inputs that are spatially rearranged relative to one another in the user interface automatically at least once in response to entry of part of the user credential via the user interface.

19. A method, comprising: the operations of any one of embodiments 1-18.

20. A system, comprising: one or more processors; and memory storing instructions that when executed by the processors cause the processors to effectuate operations comprising: the operations of any one of embodiments 1-18.

What is claimed is:

1. A tangible, non-transitory, machine-readable medium storing instructions that when executed by one or more processors effectuate operations comprising:
    receiving, with one or more processors, from a first computing device, via a network, a request to authenticate a user to access resources over a network with the first computing device;
    receiving, with one or more processors, from the first computing device, via a network, a user identifier associated with the request to access resources;
    in response to receiving the request, causing, with one or more processors, instructions to be sent that cause the first computing device to display a machine readable image, wherein:
        the machine readable image is configured to, upon being sensed with a camera of a second computing device, cause the second computing device to present, with a display of the second computing device, a user interface with a user-credential input configured based on the machine readable image displayed by the first computing device;
    receiving, with one or more processors, from the second computing device, a value demonstrating possession of a user credential and an identifier of the second computing device, the user credential being entered into the second computing device via the user interface configured based on the machine readable image displayed by the first computing device;
    determining, with one or more processors, to authorize the user to access resources over the network with the first computing device, at least in part, by:
        determining, based on the identifier of the second computing device, that the second computing device is registered in a user profile to a user corresponding to the user identifier received from the first computing device; and
        determining that the value demonstrating possession of the user credential received from the second computing device is valid; and
    in response to the determination, causing, with one or more processors, the user to be granted access to the resources over the network with the first computing device.

2. The medium of claim 1, wherein:
the operations comprise causing, with a native authentication application executing on the second computing device, the second computing device to sense the machine readable image with a camera of the second computing device;
the operations comprise receiving data indicative of a video feed from the camera with the native authentication application executing on the second computing device; and
the machine readable image causes the native authentication application executing on the second computing device to present an augmented reality user interface in which the position of at least some user inputs in the augmented reality user interface on the display screen of the second computing device change upon changes in relative orientation or position of the first computing device and the second computing device.

3. The medium of claim 2, wherein:
some visible features of the user interface on the second computing device are features appearing in video frames of video captured by the camera of the second computing device; and
other visible features of the user interface on the second computing device are represented as overlaid on the frames of video, the other aspects corresponding to at least some user inputs in the user interface.

4. The medium of claim 2, wherein:
the user interface comprises 9 or more user inputs that are spatially rearranged relative to one another in the user interface automatically at least once in response to entry of part of the user credential via the user interface.

5. The medium of claim 2, wherein:
the user interface comprises 6 or more user inputs that are visually remapped to different semantic values in the user interface automatically a plurality of times in response to respective entries of respective parts of the user credential via the user interface; and
the user credential includes a sequence of the semantic values.

6. The medium of claim 2, wherein:
the user interface comprises an on-screen keypad or keyboard with key positions that are rearranged relative to one another during entry of the user credential.

7. The medium of claim 2, wherein:
the user interface comprises an on-screen arrangement of user inputs selectable by a sequence of gestures input into the second computing device.

8. The medium of claim 2, wherein:
user interface is larger than a display screen of the second computing device and the second computing device is configured to display different portions of the user interface responsive to spatial reorientation of the second computing device.

9. The medium of claim 1, wherein:
the machine readable image or sequences of machine readable images comprising the machine readable image comprise:
    a first set of features corresponding to anchors by which the second computing device determines a pose of the second computing device relative to the machine readable image; and a second set of features that encode a value by which the second computing device authenticates at least part of the machine readable image.

10. The medium of claim 9, wherein:
the second set of features comprise a cryptographic signature signed with a private cryptographic key of an authentication system and corresponding to a public cryptographic key of the authentication system accessible to the second computing device; and
authenticating at least part of the machine readable image comprises verifying that the encoded value includes a cryptographic signature formed with the private cryptographic key based on the public cryptographic key.

11. The medium of claim 1, wherein:
the machine readable image encodes a value that distinguishes the machine readable image from other machine readable images sent to other computing devices requesting authentication;
the value that distinguishes the machine readable image from other machine readable images sent to other computing devices requesting authentication is received from the second computing device after the machine readable image is sent to the first computing device;
the value demonstrating possession of the user credential is received in association with the value that distinguishes the machine readable image from other machine readable images sent to other computing devices requesting authentication; and
determining to authorize the user comprises validating that the received value that distinguishes the machine readable image from other machine readable images sent to other computing devices requesting authentication matches the machine readable image sent to the first computing device.

12. The medium of claim 11, wherein:
the value that distinguishes the machine readable image from other machine readable images is a non-plain-text encoding of a one-time password.

13. The medium of claim 11, wherein:
the value that distinguishes the machine readable image from other machine readable images is a plain-text encoding of a one-time password appearing in the machine readable image and entered into a user interface of the second computing device by the user.

14. The medium of claim 1, wherein:
the value demonstrating possession of the user credential is received in association with data encoding attributes of a visual appearance of aspects of the first computing device other than the machine readable image being displayed; and
determining to authorize the user comprises classifying the data encoding attributes of the visual appearance as consistent with a visual appearance of computing device previously used by the user.

15. The medium of claim 1, wherein:
displaying the user interface comprises:
    detecting a plane of a display screen of the first computing device;
    determining vertices of a polygon on the a plane of the display screen of the first computing device;
    identifying an anchor on the a plane of the display screen of the first computing device based on a visual feature appearing in a frame from the camera;
    determining an affine transformation or a projective transformation of one or more user interface elements onto the detected plane;
    determining a display position on the second computing device based on a location of the anchor in the display of the second computing device; and
    causing the affine transformation or projective transformation of the one or more user interface elements to be displayed at least partially occluding the frame of video from the camera displayed on the display screen of the second computing device at the position determined relative to the anchor; and
the affine transformation or the projective transformation further comprises a transformation based on a translation matrix indicative of relative translation of the second computing device relative to the first computing device and a transformation based on a rotation matrix indicative of rotation of the second computing device relative to the first computing device, the translation matrix and the rotation matrix being determined based on both measurements from an inertial measurement unit of the second computing device and a point cloud of features detected in the video feed.

16. The medium of claim 1, the operations comprising:
steps for authenticating a user to access resources with a mobile computing device.

17. A method, comprising:
receiving, with one or more processors, from a first computing device, via a network, a request to authenticate a user to access resources over a network with the first computing device;
receiving, with one or more processors, from the first computing device, via a network, a user identifier associated with the request to access resources;
in response to receiving the request, causing, with one or more processors, instructions to be sent that cause the first computing device to display a machine readable image, wherein:
    the machine readable image is configured to, upon being sensed with a camera of a second computing device, cause the second computing device to present, with a display of the second computing device, a user interface with a user-credential input configured based on the machine readable image displayed by the first computing device;
causing, with a native authentication application executing on the second computing device, the second computing device to sense the machine readable image with a camera of the second computing device;
receiving data indicative of a video feed from the camera with the native authentication application executing on the second computing device;
presenting, responsive to the machine readable image, with the native authentication application executing on the second computing device, an augmented reality user interface in which the position of at least some user inputs in the augmented reality user interface on the display screen of the second computing device change upon changes in relative orientation or position of the first computing device and the second computing device;
receiving, with the native application, via the augmented reality user interface, a user credential;
sending, from the second computing device, a value demonstrating possession of the user credential;
receiving, with one or more processors, from the second computing device, the value demonstrating possession of a user credential and an identifier of the second computing device, the user credential being entered into the second computing device via the user interface configured based on the machine readable image displayed by the first computing device;
determining, with one or more processors, to authorize the user to access resources over the network with the first computing device, at least in part, by:
  determining, based on the identifier of the second computing device, that the second computing device is registered in a user profile to a user corresponding to the user identifier received from the first computing device; and
  determining that the value demonstrating possession of the user credential received from the second computing device is valid; and
in response to the determination, causing, with one or more processors, the user to be granted access to the resources over the network with the first computing device.

18. A tangible, non-transitory, machine-readable medium storing instructions that when executed by one or more processors effectuate operations, comprising:
  causing, with one or more processors of a mobile computing device, with a native authentication application executing on the mobile computing device, the mobile computing device to sense a machine readable image on a display of another computing device with a camera of the mobile computing device;
  receiving data indicative of a video feed from the camera with the native authentication application executing on the mobile computing device;
  identifying an authentication server based on an identifier encoded in the machine readable image;
  presenting an augmented reality user interface in which positions of at least some user inputs in the augmented reality user interface on a display screen of the second computing device change upon changes in relative orientation or position of the first computing device and the second computing device;
  receiving, the mobile computing device, the user credential entered into the augmented reality user interface; and
  sending, from the mobile computing device, to the identified authentication server, via a network, a value demonstrating possession of the user credential.

19. The medium of claim 18, wherein:
some visible features of the user interface on the second computing device are features appearing in video frames of video captured by the camera of the second computing device; and
other visible features of the user interface on the second computing device are represented as overlaid on the frames of video, the other aspects corresponding to at least some user inputs in the user interface.

20. The medium of claim 18, wherein:
the user interface comprises 9 or more user inputs that are spatially rearranged relative to one another in the user interface automatically at least once in response to entry of part of the user credential via the user interface.

* * * * *